United States Patent
Kim et al.

[19]

[11] Patent Number: 6,098,331
[45] Date of Patent: Aug. 8, 2000

[54] SOUND AND LIGHT EMITTING FISH LURE AND METHOD OF ATTRACTING FISH

[75] Inventors: Jaims N. Kim, Greely, Colo.; Melvin E. Stewart, San Antonio, Tex.

[73] Assignee: MAC Investors, LLC, Greeley, Colo.

[21] Appl. No.: 09/087,102

[22] Filed: May 29, 1998

Related U.S. Application Data

[63] Continuation-in-part of application No. 08/621,972, Mar. 25, 1996, abandoned.

[51] Int. Cl.$^7$ .......................... A01K 75/02; A01K 85/00
[52] U.S. Cl. .............................. 43/4.5; 43/17.6; 43/42.31
[58] Field of Search ................ 43/42.31, 17.1, 43/17.5, 17.6, 4.5

[56] References Cited

U.S. PATENT DOCUMENTS

| | | | |
|---|---|---|---|
| 4,227,331 | 10/1980 | Ursrey | 43/17.6 |
| 4,805,339 | 2/1989 | Fuentes | 43/42.31 |
| 5,046,278 | 9/1991 | Szilagyi | 43/17.1 |

FOREIGN PATENT DOCUMENTS

| 05002669 | 6/1991 | Japan | 43/17.1 |
|---|---|---|---|

*Primary Examiner*—Kurt Rowan
*Attorney, Agent, or Firm*—William E. Hien

[57] ABSTRACT

A fishing lure emits continuous sine wave generated sounds to emulate the sounds produced by fish themselves. A waterproof casing contains electronic circuitry that includes a precision oscillator integrated circuit for generating a continuous sine wave sound that is swept about a predetermined center frequency of approximately 3.0 kHz and that extends between a low frequency of approximately 1.8 kHz and a high frequency of approximately 4.2 kHz. The output of the precision oscillator is coupled to a miniature piezoelectric speaker for audibly reproducing the generated sine wave sound. An LED flasher integrated circuit coupled to the precision oscillator integrated circuit serves to control a light emitting diode to flash at a predetermined rate or be constantly lit to thereby act as an additional fish attractor in combination with the emitted continuous sine wave sound.

8 Claims, 1 Drawing Sheet

SOUND AND LIGHT EMITTING FISH LURE AND METHOD OF ATTRACTING FISH

REFERENCE TO RELATED APPLICATION

This application is a Continuation-in-part application under 37 CFR 1.53(b) of prior U.S. patent application Ser. No. 08/621,972 filed Mar. 25, 1996, now abandoned.

BACKGROUND AND SUMMARY OF THE INVENTION

This invention relates generally to fishing lures which attract fish by means of sight, sound or motion. More particularly, the lure of the present invention produces sine wave sounds at discrete frequencies that are emitted in a predetermined sequence. In addition, the present lure emits a steady or flashing white or colored light produced by one or more light emitting diodes (LEDs).

Research has shown that selected motion, sound, light, or combination thereof, attract different species of fish. Published studies document the ability of a fish to sense vibrations in the water through lateral lines located on both sides of its body. In addition, it is known that some predator fish recognize and approach sources of steady or flashing light.

Fish upon which predator fish prey, such as minnows and the like, tend to shimmer due to the distortion of sunlight in and on water, as do insects which have fallen into the water, thereby causing flashes of reflected sunlight which serve to further entice predator fish to approach and strike. The published studies have been used to explain how entire schools of fish are able to make numerous sharp turns in precise synchronism without colliding. This is accomplished by their ability to sense vibrations and react as a group. The ability of predator fish to single out and prey upon sick or wounded fish in a school is largely the result of the predator's ability to sense, by way of its lateral body lines, erratic movement or noises created by disturbances in the water.

Fish lures that generate noise are known in the prior art. Examplary of this prior are is U.S. Pat. No. 2,757,475 to Pankove, which is directed to a fishing lure in which an oscillator is employed to impart electromechanical vibrations to a diaphragm and emit these vibrations into the water, resulting in a buzzing sound within a frequency of 600–1000 Hz.

U.S. Pat. No. 2,784,399 to Smith is directed to a sound producing fishing lure in which a vibrating armature contacts a sounding diaphragm which is in direct contact with the water, thereby producing a buzzing sound of unknown frequency.

U.S. Pat. No. 4,583,313 to Dugan, Jr. is directed to a fishing lure which emits electronically produced square wave tones that tend to be raspy and irritating in tonal quality.

U.S. Pat. No. 4,805,339 to Fuentes et al. is directed to a sonic fishing lure employing a pair of astable multivibrators running a 1 Hz and 100 Hz to produce intermittent pulses of square wave sound at approximately 100 Hz for short durations of approximately 700 milliseconds that alternate with silent periods of approximately 200 milliseconds.

U.S. Pat. No. 4,960,437 to Watson et al. is directed to a fishing lure that employs a coil with a movable plunger inside a water resistant cylinder. As the plunger moves back and forth in the cylinder, it strikes the walls of the cylinder, thereby producing a fish-luring noise.

U.S. Pat. No. 5,046,278 to Szilagyi et al. is directed to a fish caller that produces randomly modulated noise signals comprising a digital pulse train emitted through an amplified underwater speaker. It is designed to attract fish to a fishing area in which the speaker is located.

U.S. Pat. No. 5,157,857 to Livingston is directed to a lure that includes electronic devices utilizing a single LED or a pair of LEDs connected to circuitry which causes the LEDs to blink so as to attract fish. The apparatus includes a bobber for use in connection with the lure and through which fishing line is strung. The bobber acts as an alarm which is set off by way of a water activated switch wherein a noise device and LED are activated when a fish strike pulls the bobber into the water, thereby alerting the fisherman of a strike.

U.S. Pat. No. 5,177,891 to Holt is directed to a game fish attracting device wherein digital recording or signatures of underwater predator-attracting sounds, such as those produced by various species of the fish bait, are played back under water in order to attract fish.

The sound producing lures of the prior art are disadvantageous in that they typically employ mechanical or electronic means to generate square wave sounds. Square waves, which reach their peak amplitude instantaneously, exhibit a characteristic clicking, buzzing or static-like sound. Since it has been shown that fish make sounds which are more closely related in tonal quality to that of a musical instrument, it would advantageous to duplicate that tonal quality in a lure.

It is therefore the principal object of the present invention to provide a fishing lure that emits continuous sine wave generated sounds to emulate the sounds produced by fish themselves.

It is a further object of the present invention to provide a fishing lure that also emits a steady or flashing light as an additional attraction to fish in the vicinity of the lure.

This and other incidental objects are accomplished in accordance with the illustrated preferred embodiment of the present invention by providing a waterproof casing within which is contained electronic circuitry that includes a precision oscillator integrated circuit for generating a continuous sine wave sound that is swept about a predetermined center frequency of approximately 3.0 kHz and that extends between a low frequency of approximately 1.8 kHz and a high frequency of approximately 4.2 kHz. The output of the precision oscillator integrated circuit is coupled to a miniature piezoelectric speaker for audibly reproducing the generate sine wave sound. An LED flasher integrated circuit is coupled to the precision oscillator integrated circuit and serves to control an LED such that the LED flashes at a predetermined rate or is constantly lit to thereby serve as an additional fish attractor in combination with the continuous sine wave sound.

DETAILED DESCRIPTION OF THE INVENTION

Figure 1:
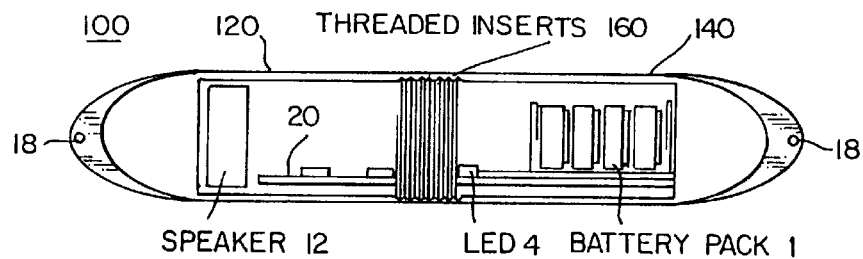
FIG. 1 is a pictorial diagram of a fishing lure constructed in accordance with the present invention.

Referring now to FIG. 1, there is shown a pictorial diagram of a fishing lure 100, illustrating the typical positioning of the components contained therein. Lure 100 comprises cylindrically shaped left and right casing members 120 and 140 that may be connected by a conventional threaded insert 160, for example, to provide a waterproof casing when assembled, but to permit access to inner cavities of the casing members 120, 140 for installation of circuitry and for access to a battery pack 1. Casing members 120, 140 may comprise a clear or colored plastic or other suitable material. The outer end of each of the casing members 120, 140 is tapered to include eyelets 18 through which a fishing line may be tied to thereby incorporate lure 100 with conventional fishing tackle.

Figure 2:
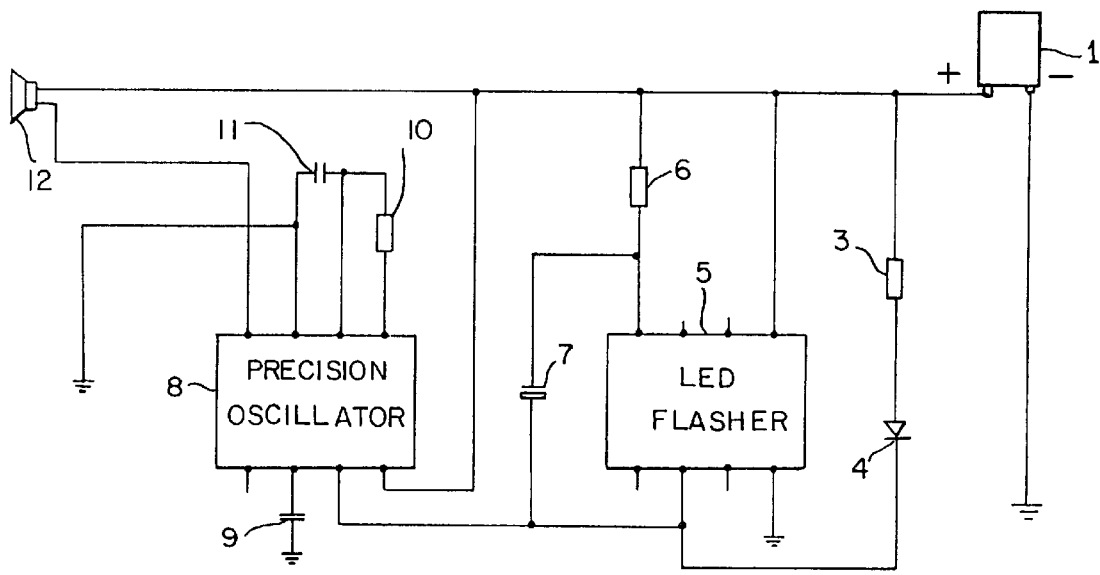
FIG. 2 is a detailed schematic diagram of circuitry employed in the fishing lure of FIG. 1.

Referring now to FIG. 2, there is shown a detailed schematic diagram of circuitry that may be fabricated on a conventional printed circuit board 20 mounted within the casing members 120, 140. The circuitry includes a precision oscillator 8 that may comprise a commercially available LM-567M precision oscillator integrated circuit, for example. A capacitor 9 (typically 0.047 uf), coupled to precision oscillator 8, serves as a loop filter capacitor to control a center frequency produced by precision oscillator 8. A timing capacitor 11 (typically 0.01 uf) and a timing resistor 10 (typically 3300 ohms) are coupled to precision oscillator 8. A timing capacitor 7 (typically 10 uf) provides a voltage that increases and decreases linearly to control precision oscillator 8. A conventional miniature piezoelectric speaker 12 audibly reproduces the continuous sine wave generated by precision oscillator 8. An LED flasher 5 that may comprise a commercially available LM-3909 LED flasher, for example, controls the flashing rate of an LED 4. Timing capacitor 7 and a timing resistor 6 (typically 10K ohms) serve to time the LED flasher. An LED current limit resistor 3 (typically 330 ohms), connected in series with LED 4, serves to limit current to LED 4. LED 4 may comprise a surface mounted clear, white or colored LED that is controlled to flash at a predetermined rate or to be constantly lit. Operating power for the circuitry of FIG. 2 is supplied by means of a battery pack 1 that may comprise commercially available watch or calculator batteries, for example.

Figure 3:
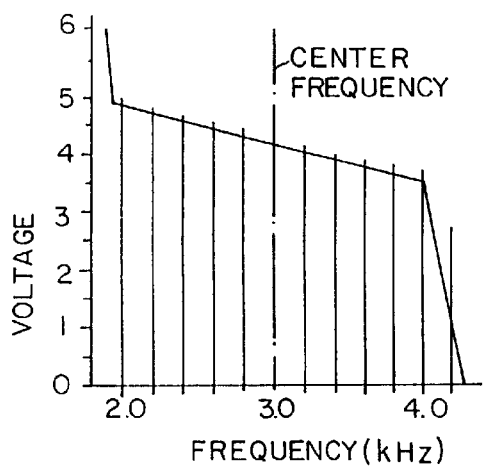
FIG. 3 is a graph illustrating the relationship between the voltage applied to a precision oscillator integrated circuit within the circuitry of FIG. 2 and the frequency in kilohertz of the swept sine wave sound produced thereby.
Figure 4:
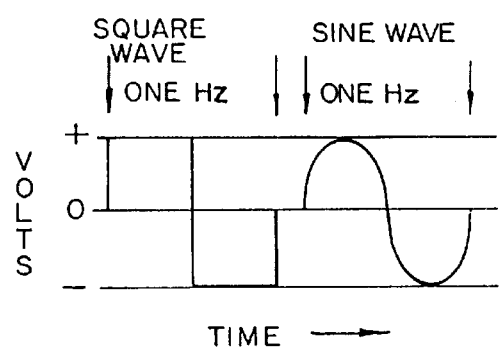
FIG. 4 is a diagram showing one cycle of a square wave and one cycle of a sine wave to illustrate the characteristic differences between those two types of waveforms.

Referring now to the graph of FIG. 3, there is shown the relationship between the voltage applied to precision oscillator 8 and the frequency in kilohertz of the sine wave produced thereby.

In operation, lure 100 of the present invention emits a continuous sine wave sound at a predetermined frequency within the range of 1.8 kHz to 4.2 kHz, as set by the output of LED flasher 5, which controls the voltage applied to precision oscillator 8. The continuous sine wave sound emitted by lure 100 is a more natural tone, as opposed to the square wave sounds of prior art lures which contain significant harmonic overtones and can best be described as being raspy or irritating like buzzing or clicking sounds that are much less realistic in the environment in which fish exist. LED 4 adds to the attractiveness of lure 100 in that the light emitted thereby causes a secondary response in fish, which studies documented in the literature have shown to appeal to one of a predator's filtering processes in recognizing its prey.

Also, LED 4 is readily recognizable in murky water by fish that may have been initially attracted by the sound emitted by lure 100. Designed to by lightweight and compact, lure 100 is submersible so that it may be incorporated with the bait and hooks of the angler's choice, thus giving fish, even after the enticement of sound, sight, and motion, a target to strike.

What is claimed is:

1. A fishing lure comprising:

a waterproof case:

electronic sound generating means mounted within the case for generating a continuous sine wave signal that is swept about a predetermined center frequency and that extends between a predetermined low frequency and a predetermined high frequency;

speaker means mounted within the case and coupled to the electronic sound generating means for audibly reproducing the continuous sine wave signal generated thereby;

a light emitting diode mounted within the case; and flasher means mounted within the case and coupled to the light emitting diode for controlling the light emitting diode.

2. A fishing lure as in claim 1 wherein the electronic sound generating means comprises a precision oscillator integrated circuit.

3. A fishing lure as in claim 1 wherein the flasher means comprises a light emitting diode flasher integrated circuit.

4. A fishing lure as in claim 1 wherein the speaker means comprises a piezoelectric speaker.

5. A fishing lure as in claim 1 wherein said predetermined center frequency is 3.0 kilohertz and said low and high frequencies are 1.8 kilohertz and 4.2 kilohertz, respectively.

6. A fishing lure as in claim 1 wherein the flasher means controls the light emitting diode to flash at a predetermined rate.

7. A fishing lure as in claim 1 wherein the flasher means controls the light emitting diode to be constantly lit.

8. A method for attracting fish, the method comprising:

providing a waterproof case;

providing electronic sound generating means mounted within the case for generating a continuous sine wave signal that is swept about a predetermined center frequency and that extends between a predetermined low frequency and a predetermined high frequency;

providing speaker means mounted within the case and coupled to the electronic sound generating means for audibly reproducing the continuous sine wave signal generated thereby;

providing a light emitting diode mounted within the case; and providing flasher means mounted within the case and coupled to the light emitting diode for controlling a flashing rate of the light emitting diode.

* * * * *